United States Patent [19]
Marchesi et al.

[11] Patent Number: 5,235,665
[45] Date of Patent: Aug. 10, 1993

[54] BRANCHING DEVICE FOR FIBRE-OPTIC CABLES

[75] Inventors: Franco Marchesi, Brugherio; Giancarlo Zini, Melegnano; Stefano Crico, Milan, all of Italy

[73] Assignee: SIRTI S.p.A., Milan, Italy

[21] Appl. No.: 872,088

[22] Filed: Apr. 22, 1992

[30] Foreign Application Priority Data

May 6, 1991 [IT] Italy ................ MI 91 A/001226

[51] Int. Cl.⁵ ............................................. G02B 6/36
[52] U.S. Cl. ................................... 385/135; 385/134; 385/136
[58] Field of Search ................ 385/135, 134, 136, 137

[56] References Cited

U.S. PATENT DOCUMENTS

| | | | |
|---|---|---|---|
| 5,067,784 | 11/1991 | Debortoli et al. | 385/135 X |
| 5,109,467 | 4/1992 | Hogan et al. | 385/135 |

FOREIGN PATENT DOCUMENTS

| | | |
|---|---|---|
| 0408266 | 1/1981 | European Pat. Off. . |
| 0281196 | 9/1988 | European Pat. Off. . |
| 2721300 | 11/1978 | Fed. Rep. of Germany . |
| 8905509 | 7/1989 | Fed. Rep. of Germany . |

Primary Examiner—John D. Lee
Assistant Examiner—Phan Thi Heartney
Attorney, Agent, or Firm—Hedman, Gibson & Costigan

[57] ABSTRACT

A branching device for fibre-optic cables, consisting essentially of two half-casings which can be joined together and contain means for connection to a multi-fibre/fibre-optic unit and means for connection to a plurality of single-fibre/fibre-optic units, the half-casings being shaped to form a cavity arranged to contain a plurality of optical fibres, the cavity being of essentially annular shape and having a width greater than the thickness determined by the plurality of separate optical fibres within the device, the optical fibres within the branching device which connect together the means for connection to a multi-fibre/fibre-optic unit and the means for connection to a plurality of single-fibre/fibre-optic units having a length greater than the length of the minimum development of the annular cavity.

6 Claims, 2 Drawing Sheets

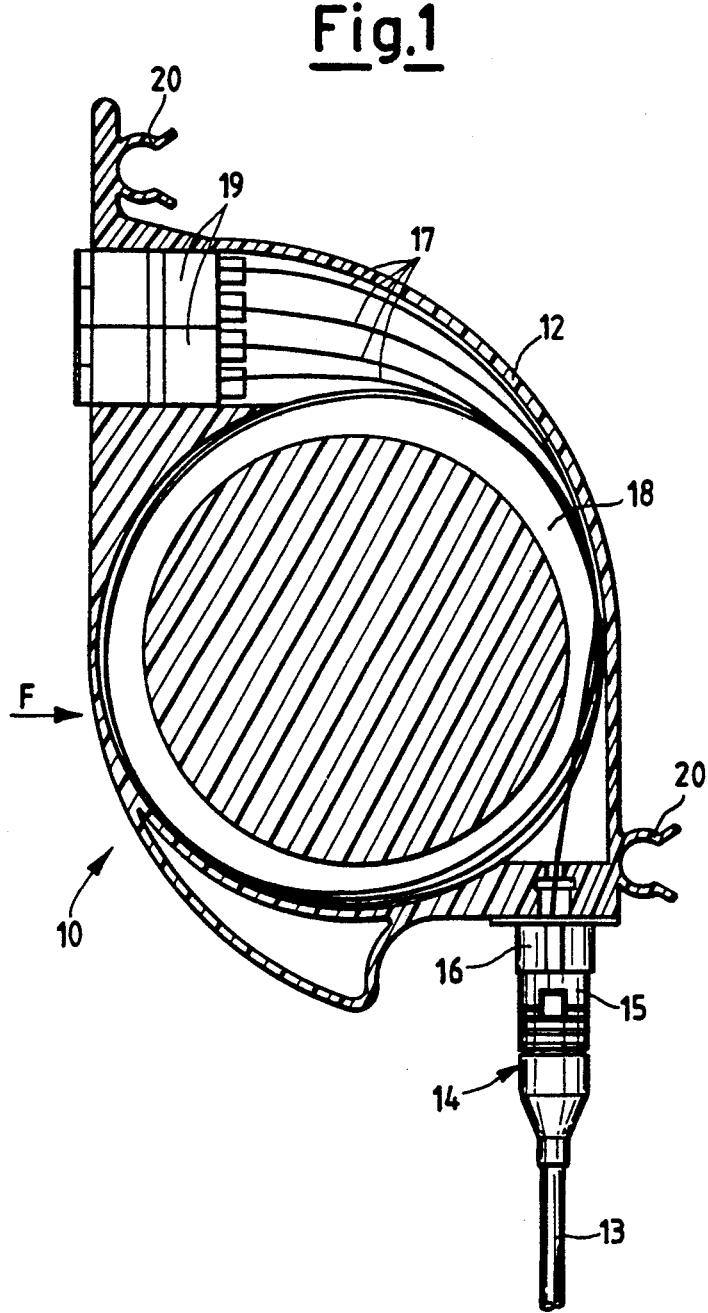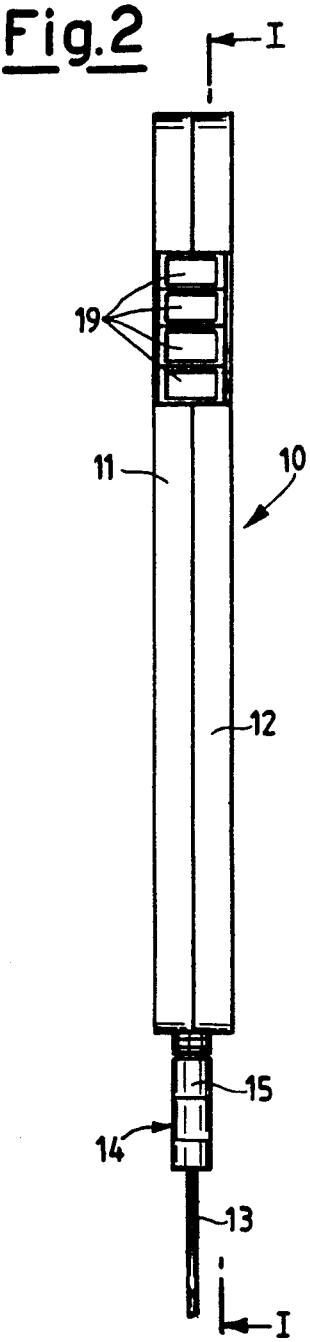

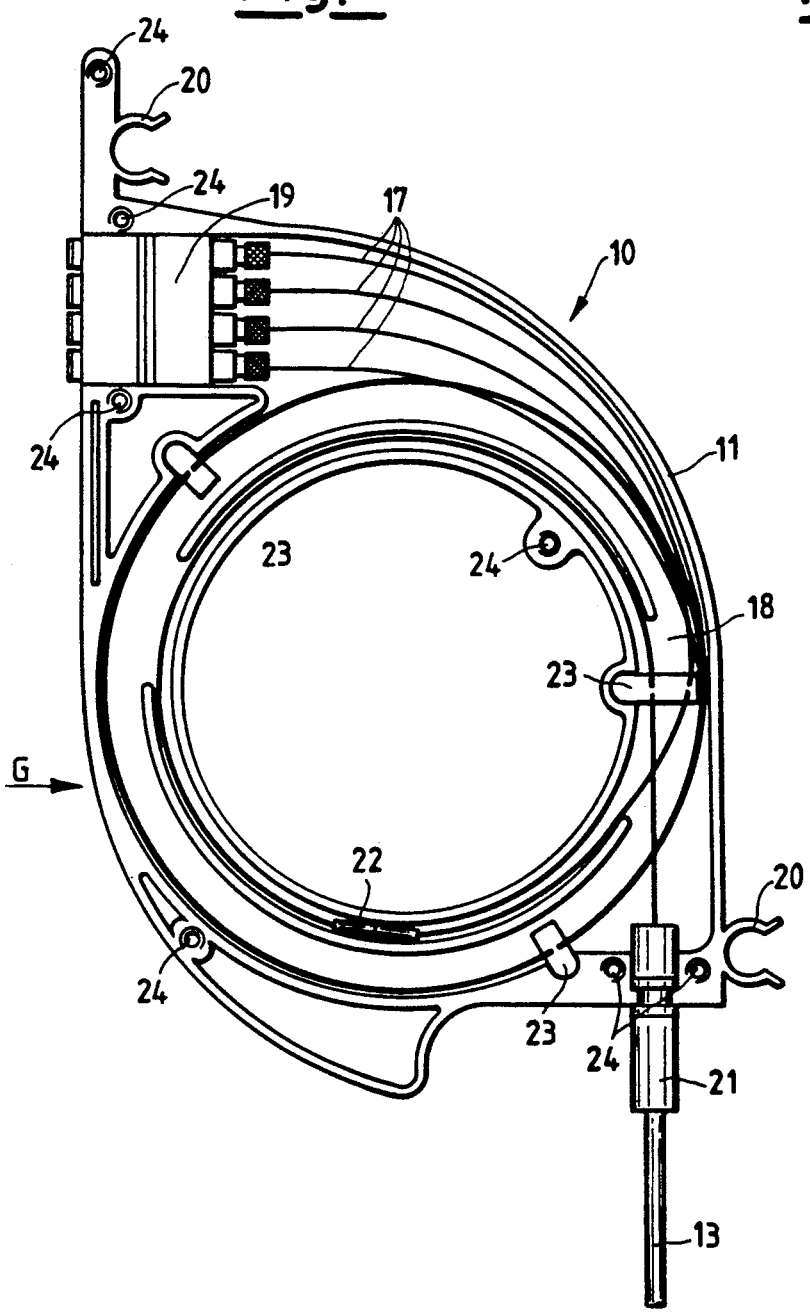
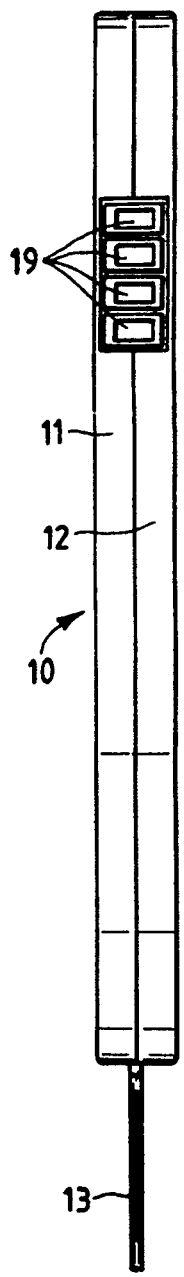

BRANCHING DEVICE FOR FIBRE-OPTIC CABLES

This invention relates to a branching device for fibre-optic cables.

Fibre-optic cables are increasingly used in the most varied applications, especially in the telecommunications field. Where each cable contains a plurality of optical fibres, it is common practice to group the optical fibres into small separate groups within the cable, these groups normally containing from two to twelve optical fibres each.

The advantage obtained by such grouping is essentially that in this manner the fibre packing density is increased for equal external cable diameters.

By grouping the fibres into small groups each containing a small number of fibres, there is the further advantage of facilitating the recognition and ordered numbering of the individual optical fibres within the cable.

The methods most commonly used for achieving this grouping is to insert the groups of fibres into tubes or to glue the individual optical fibres into tapes of coplanar parallel fibres.

In any fibre-optic network in which such multi-fibre units are present there are points at which the individual optical fibres of these units are required to make abutting contact with single-fibre units.

For this purpose, devices are commonly used consisting of two half-casings which when joined together simply protect the points at which the connections between the multi-fibre units and the individual fibres are made.

The connections are commonly made by fusion-splicing or by fixed or movable miniconnectors.

However, because of the relative mechanical delicacy of optical fibres it is essential that the passage from multi-fibre units to single-fibre units is made in such a manner as to ensure absolute protection of each individual fibre.

In fibre-optic networks it is also frequently necessary, as in the case of any electrical cabling, to subsequently disturb the connections in order to make additions or modifications after installation.

It is therefore essential for an operator to be able not only to carry out ordinary maintenance but also to mount and replace connectors.

In addition, as there is a substantial difference between the thermal expansion coefficients of the optical fibre (of silica) and its protective covering (of plastics material) it is particularly important that cabling is arranged such that when temperature changes occur no dangerous mechanical stressing of the fibres results.

An object of the present invention is to provide a branching device for fibre-optic cables of the said type and for the stated applications which solves the problem of passing from multi-fibre units to single-fibre units, and also simplifies maintenance and connector mounting.

A further object of the present invention is to provide a branching device with which no problems arise in the arranging of the various parts deriving from dangerous mechanical stressing of the optical fibres when temperature changes occur.

These objects are attained by a branching device for fibre-optic cables, consisting essentially of two half-casings which can be joined together and contain means for connection to a multi-fibre/fibre-optic unit and means for connection to a plurality of single-fibre/fibre-optic units, characterized in that said half-casings are shaped to form a cavity arranged to contain a plurality of optical fibres, said cavity being of essentially annular shape and having a width greater than the thickness determined by said plurality of separate optical fibres within said device, said optical fibres within said branching device which connect together said means for connection to a multi-fibre/fibre-optic unit and said means for connection to a plurality of single-fibre/fibre-optic units having a length greater than the length of the minimum development of said annular cavity.

The structural and functional characteristics and advantages of a device according to the present invention will be more apparent from the description given hereinafter by way of non-limiting example with reference to the accompanying schematic drawings, in which:

FIG. 1 is a section through a first embodiment of as device according to the present invention, taken on the line I—I of FIG. 2;

FIG. 2 is a view of the entire device taken in the direction of the arrow F of FIG. 1;

FIG. 3 is a top plan view of a second embodiment of a device according to the present invention; and FIG. 4 is a view of the entire device taken in the direction of the arrow G of FIG. 3.

FIGS. 1 and 2 show a branching device for fibre-optic cables, indicated overall by 10 and suitable for connection to units containing four optical fibres.

The number of optical fibres included in this embodiment is only indicative, and can be different.

Observing FIG. 2 it can be seen that the branching device 10 consists of two half-casings indicated by 11 and 12 respectively. The two half-casings 11 and 12 can be joined together for example by through screws or by snap-insertion.

Again with reference to FIGS. 1 and 2 the reference numeral 13 indicates a multi-fibre unit containing four optical fibres. The optical fibres contained in the multi-fibre unit 13 can either be combined into a tape or be contained in a tube.

The multi-fibre unit 13 enters an entry device consisting of a four-pole plug-in miniconnector indicated overall by 14. The miniconnector 14 consists of two complementary parts, on the first of which, indicated by 15, the four fibres of the multi-fibre unit 13 surface.

Four further optical fibres 17 surface on the second 16 of the two parts into which the miniconnector 14 is divided, the part 16 of the miniconnector 14 being clamped between the two half-casings 11 and 12 of the branching device 10.

As can be seen from the sectional view of FIG. 1, the two half-casings 11 and 12 are shaped to form an annular cavity 18 when joined together.

The four fibres 17 within the branching device 10 extend along the annular cavity 18 until they reach four side-by-side single connectors indicated overall by 19.

It is apparent that in this manner, the four separate optical fibres 17 are subjected only to the stress deriving from the shape of the cavity 18 through which they extend.

This stress, essentially of flexural type, is totally compatible with the proper preservation of the fibres and produces no attenuation increase in the signal transmitted by the fibres.

In this respect it is well known that damage to optical fibres and attenuation of the light signal which they transmit are greater the sharper the change in direction to which the optical fibres are subjected.

From FIG. 1 it can be seen that advantageously the width of the cavity 18 is considerably greater than the width which would be strictly necessary to contain the separate optical fibres 17. Because of this, small length differences in the separate optical fibres 17 compared with the middle line through the cavity 18 can be well tolerated.

Thus any length variations in the optical fibres deriving from temperature changes in the environment in which the branching device 10 is located have absolutely no influence. Because of the structure of the annular cavity 18, the separate optical fibres 17 can pass more than once about the cavity 18, to form a sort of fibre winding.

In particular, the optical fibres 17 can have a length at least greater than the length of the minimum development of the annular cavity 18.

This possibility offered by the branching device 10 of being able to contain in its interior optical fibres having a length greater than that strictly necessary for making the connection between the multiconnector 14 and the single connectors 19 is particularly advantageous in view of any later connections to be made to connectors and subsequent maintenance.

In this respect, in fibre-optic technology the connection between fibres and connectors is made by stripping away the covering, then grinding and gluing.

All these operations consume the end of the fibre, consequently reducing its useful length.

It is therefore immediately apparent that having a reserve of fibre inside the branching device itself for possible future connection to other connectors can be very useful.

From FIG. 1 it can be seen that instant fixing means 20 are provided on the half-casings 11 and 12 of the branching device 10. The presence of the instant fixing means 20 and the particular external shape of the half-casings 11 and 12 mean that the devices can be mounted very quickly and with high stability, and that a large number can be installed per unit volume.

Hence because of this the branching device 10 allows complex units to be created, such as permutators, distribution frames and the like in which the cabling, although bulky, must be ordered, and able to be easily inspected, extended and if necessary replaced. The two half-casings 11 and 12 can be joined together for example by snap-insertion, using freely releasable complementary elements not shown in the figures.

Alternatively, if no future work is to be done on the fibres and the branching device 10 is of the disposable type, the two half-casings can be non-removably welded together.

FIGS. 3 and 4 show a second embodiment of the device of the present invention in which those parts in common with the embodiment of FIGS. 1 and 2 carry the same reference numerals. With reference to FIGS. 3 and 4 it can be seen that the multi-fibre unit 13 enters an entry device 21 clamped between the half-casings 11 and 12 which form the casing of the branching device 10.

The protective covering which resists traction on the multi-fibre unit 13 is interrupted and rigidly fixed to the entry device 21, whereas the optical fibres continue for a convenient length within the branching device 10.

The optical fibres of the multi-fibre unit 13 are connected inside the cavity 18 to the separate optical fibres 17 of the branching device 10.

This connection is preferably made either by a multiple miniconnector 22 or by other types of mechanical connector. In certain cases it can be convenient to make the connection between the fibres 17 and the fibres of the multi-fibre unit 13 by fusion-splicing.

Guide elements 23 can be provided in the cavity 18 to facilite the positioning of the optical fibres within the annular cavity 18.

The two half-casings 11 and 12 can be joined together for example by screws passing through threaded holes 24.

This second embodiment retains all the advantages described with reference to the first embodiment, and is more simple and economical.

However, as it is not provided with a plug-in connector this second embodiment does not have the same versatility and ease of connection to multi-fibre units as the first embodiment.

The two half-casings 11 and 12 which form the main casing of the branching device 10 can be constructed of any type of material. Advantageously, these half-casings can be of plastics material to result in a device which is lightweight, strong and of low cost.

We claim:

1. A branching device for fibre-optic cables, consisting essentially of two half-casings which can be joined together and contain external means for connection to a multi-fibre/fibre-optic unit and means for connection to a plurality of single-fibre/fibre-optic units, characterized in that said half-casings are shaped to form a cavity arranged to contain a plurality of optical fibres, said cavity being of essentially annular shape and having a width greater than the thickness determined by said plurality of separate optical fibres within said device, said optical fibres within said branching device which connect together said means for connection to a multi-fibre/fibre-optic unit and said means for connection to a plurality of single-fibre/fibre-optic units having a length greater than the length of the minimum development of said annular cavity.

2. A device as claimed in claim 1, characterized in that said means for connection to said plurality of single-fibre/fibre-optic units are a plurality of single fibre-optic connectors.

3. A device as claimed in claim 1, characterized in that said means for connection to said multi-fibre/fibre-optic unit consist of a first and a second part of a multiple plug-in optical miniconnector, on said first part there surfacing the multiple fibres of said multi-fibre/fibre-optic unit, said second part being fixed to said branching device and being removably connectable to said first part.

4. A device as claims in claim 1, characterized in that said external means for connection to said multi-fibre/fibre-optic unit consist of an entry device to which a traction-resistant protective covering of said multi-fibre/fibre-optic unit can be fixed, said entry device being arranged to be clamped between said half-casings, and further consist of a multiple optical miniconnector contained within said cavity, said multiple optical miniconnector being arranged to connect within said branching device said separate optical fibres to the optical fibres of said multi-fibre/fibre-optic unit, which penetrate into said branching device through said entry device.

5. A device as claimed in claim 1, characterized in that instant fixing means are provided on said half-casings.

6. A device as claimed in claim 1, characterized in that said half-casings are constructed of plastics material.

* * * * *